United States Patent [19]

Pelton

[11] Patent Number: 4,998,710

[45] Date of Patent: Mar. 12, 1991

[54] APPARATUS FOR HOLDING AND REFINING OF MOLTEN ALUMINUM

[75] Inventor: John F. Pelton, Yorktown Heights, N.Y.

[73] Assignee: Union Carbide Industrial Gases Technology Corporation, Danbury, Conn.

[21] Appl. No.: 436,829

[22] Filed: Nov. 14, 1989

Related U.S. Application Data

[63] Continuation-in-part of Ser. No. 53,039, May 22, 1987.

[51] Int. Cl.$^5$ .............................................. C04B 35/02
[52] U.S. Cl. .................................. 266/286; 266/275; 266/280; 501/123
[58] Field of Search ............... 266/280, 286, 285, 235, 266/242, 275; 501/123, 124, 125

[56]  References Cited

U.S. PATENT DOCUMENTS 4,040,610  8/1977  Szekely ............................. 266/235
4,174,972 11/1979  Drouzy et al. ........................ 106/64

Primary Examiner—S. Kastler
Attorney, Agent, or Firm—Alvin H. Fritschler

[57]  ABSTRACT

The incorporation of a small amount of metal fluoride or fluosilicate into the refractory fibrous insulating board lining of an aluminum refining vessel prevents the infiltration of the internal voids of said lining by molten aluminum.

18 Claims, No Drawings

APPARATUS FOR HOLDING AND REFINING OF MOLTEN ALUMINUM

REFERENCE TO RELATED APPLICATION

This application is a continuation-in-part of applicant's copending parent application, Serial Number 053,039, filed May 22, 1987.

BACKGROUND OF THE INVENTION

1. Field of the Invention

This invention relates to apparatus for the holding and refining of aluminum. More particularly, it relates to such apparatus incorporating improved refractory insulation.

2. Description of the Prior Art

In the refining of aluminum, the use of externally heated, refractory lined cast iron tubs as the refining vessels has been found to be disadvantaged by the limited and somewhat unpredictable life of said tubs. This undesired condition results from the failure of the cast iron tubs because of cracking, bulging, chloride corrosion or wash-out. In addition, design constraints pertaining to such cast iron tubs result in the use of configurations that are difficult to clean, creating a further practical disadvantage to their use in commercial operations.

In an effort to overcome such disadvantages, a refining system was devised consisting of a refractory lined vessel having vertical tubular immersion heaters, such as silicon carbide tubes with internal helical resistance heating elements, suspended from the refining vessel cover. In this approach, the heaters were found to have a limited life and, in practice, were very hard to replace. When a heater failed because of the breakage of the silicon carbide tube, pieces of the broken tube would frequently cause breakage of the spinning nozzle used to inject gas into the molten aluminum within the vessel. In addition, such a system was very difficult to clean because of the many recesses between adjacent heater tubes, and between the heater tubes and the vessel walls, where dross would accumulate and be difficult to remove in a convenient manner.

As a result of such problems, an improved 15 apparatus was developed for the refining of aluminum or other molten metals. This apparatus comprised an all-refractory system in which two opposite side walls each consisted of a graphite block having electrical heating elements positioned in vertical holes provided in the graphite blocks, said holes being open at the top and closed at the bottom thereof. Various other features of this system are disclosed in the Szekely patent, U.S. Pat. No. 4,040,610. This system thus provided an internal heating source while overcoming the drawbacks associated with the use of the immersion heater. It was found to increase heater life, minimize erosion and facilitate repair of the system. For the holding of aluminum in the molten state, such a system comprised a vessel adapted for the holding of aluminum in a molten state and including a shell having an inner refractory lining impervious to molten metal, with a lining comprising graphite blocks for a portion of the interior of the shell that is intended to be below the surface of melt, and at least one heating means disposed within one or more of the blocks. For application in the refining of aluminum, the system also included at least one rotating gas distributing means disposed in the vessel, as well as inlet and outlet means for molten metal and for gases.

All-refractory systems using graphite heater blocks have been found to constitute a desirable improvement in the art and have been employed to advantage in commercial aluminum refining operations. Nevertheless, further improvements in such systems are desirable to enhance their suitability by the overcoming of practical operating problems encountered in commercial operations. One such problem relates to the refractory lining and insulation employed in such systems.

In the construction of a conventional all-refractory molten aluminum furnace or holding vessel, the vessel is usually lined with dense castable refractory or with dense refractory bricks. This material is not infiltrated by molten aluminum because it is too dense and contains only a small amount of porosity in the form of isolated bubbles and the like. The dense lining is backed up with a low density refractory insulating material, which in turn is contained within a steel shell. It is very difficult to keep the dense inner refractory lining entirely leak tight. In order to prevent molten metal from flowing through a crack, or joints in the inner refractory lining, and into and through the low density back-up insulation, the common practice is to design the system so that the temperature on the outer side of the dense lining is below the melting point of the aluminum alloy being processed when the contained molten metal is at its highest temperature.

The thermal conductivity of suitable dense lining refractories is relatively high as compared with that of insulation refractories. As referred to herein, the thermal conductivity of a material is defined in terms of BTU/hr/ft$^2$ at a temperature gradient of 1° F. per inch at a given temperature. The thermal conductivity of such hard, dense refractory materials is typically from about 14 to about 20 at 1500° F. For example, the thermal conductivity of high alumina castable refractory, such as Alfrax 66, commonly used for the hard, dense inner lining, is about 14 at 1500° F. and about 19 at 1000° F. The density of Alfrax 66 material is about 160 lb/ft$^3$, and the density of such dense refractory materials in general typically ranges from about 160 to about 180 lb/ft$^3$.

The inner lining as employed in conventional systems as described above must be fairly thick, or the systems must allow for a fairly large heat loss by making the refractory insulation fairly thin. It is generally desirable, however, to operate at fairly low heat loss levels. In such operations, it is desirable to position heating elements in only one wall of the vessel, providing practical advantages such as easier vessel cleaning and more versatile operation. An increase in the thickness of the insulating refractory in order to reduce heat loss, however, requires a corresponding proportionate increase in the thickness of the inner dense refractory lining to maintain the desired temperature profile across the wall thickness as indicated above. As a result, very thick vessel walls would be required to limit heat loss to the desired extent, if the desired limitation could actually be accomplished. As the overall wall thickness of the vessel increases, the outside surface area also increases rapidly for small refining systems, and the benefits derived from increased wall thickness are somewhat negated by the corresponding increase in the effective wall area of the vessel. In some instances, refining systems need to be positioned in such small available plant space that such thick walls can not be tolerated in any event. It will be seen from the above that there is a genuine need in the art for an all-refractory system capable of operation at a fairly low heat loss level and incorporating only moderately thick walls.

One solution to this problem involves the use of an insulating refractory lining as the molten aluminum barrier. In this approach, the refining chamber usually is lined with hard, dense materials, such as graphite, silicon carbide and dense alumina cast refractory, that can be readily scraped clean for convenience in the maintenance of the refining vessel. Such lining surfaces do not have leak tight joints, however, so liquid metal, i.e. molten aluminum, can pass through such surface joints. Such hard lining materials, including the graphite heater block that may form one or more walls, are desirably backed up with a relatively high density refractory fibrous insulating board, e.g. a 60 lb./ft$^3$ board, compared to the relatively lowdensity board, e.g. 10–20 lb/ft$^3$, commonly used for most refractory fibrous insulating boards. Such relatively high density, fibrous insulating boards are fitted together as completely as possible, but the joints between them, of course, are not leak tight. However, a relatively small thickness of this dense board, typically 3 to 4 inches, when backed-up with a relatively lower density (e.g. 20 lb/ft$^3$) and lower thermal conductivity, refractory fibrous insulation, is capable of desirably limiting the heat loss of the system, and, at the same time, maintaining the temperature on the outside of the higher density board below the melting point of aluminum.

It will be appreciated that the thermal conductivity of the refractory fibrous insulating board referred to above is typically very considerably less, i.e. an order of magnitude less, than that of the hard, dense inner lining refractory material referred to above. Thus, the PC-45 fibrous insulating board referred to below, having a density of 60 lb/ft$^3$, has a thermal conductivity of 1.6 at 1500° F. and of 1.1 at 750° F. Fibrous insulating board having a lower density of 20 lb/ft$^3$, i.e. so-called Al-3 board, has a thermal conductivity of 1.2 at 1600° F., 0.9 at 1200° F., and 0.5 at 200° F. Such values are typical for such refractory fibrous insulating board, which has a thermal conductivity generally of below about 1.8 at 1500° F., commonly from about 1.0 to about 1.6 at said temperature. The density of such refractory fibrous insulating board is generally below 80, typically from about 15 to about 70 lb/ft$^3$. It will be appreciated from the above that refractory fibrous insulating board has a much lower density and thermal conductivity than the dense refractory lining commonly employed as a molten aluminum barrier in refining systems.

This approach, employing relatively higher density refractory insulating board as a metal barrier, is dependent upon the ability of said insulating board material to withstand penetration or infiltration by molten aluminum as discussed below. A convenient, commercially available refractory fibrous insulating material, appearing to be suitable for such use as a metal barrier, is the relatively high density (60 lb./ft.$^3$) insulating board marketed under the PC-45 designation by Rex-Roto Corporation. Upon immersion in molten aluminum for periods up to 11 weeks, no significant penetration of said insulating board by the aluminum was found to occur.

Refining systems constructed using relatively high density, fibrous insulating board as a metal barrier, e.g. said PC-45 material, were placed into operation and, surprisingly, were found to develop hot spots in the vicinity of the graphite heater block. Upon being removed from operation because the heat loss at operating temperature exceeded the capacity of the heater, such systems were partially disassembled, and it was found that the PC-45 insulating board had been infiltrated completely by aluminum. Part of the relatively low density insulation behind the PC-45 board was also found to have been infiltrated by aluminum. Where metal infiltration had occurred, the PC-45 board was completely filled with metal, the wetting of the insulating board by metal being so complete that the metal had been drawn upward several inches above the operating level of molten aluminum in the refining vessel by capillary action.

The unexpected infiltration of the dense refractory insulating board by aluminum effectively destroys its usefulness in refining systems. Infiltration, as that term (sometimes also referred to as penetration) is used herein, denotes the filling of the internal voids of refractory fibrous insulating board with molten aluminum. As a result, the characteristics of said board are changed from having a very low thermal conductivity to having a thermal conductivity close to that of the molten aluminum that infiltrated said internal voids of the relatively lower density refractory fibrous insulating board. Thus, the molten aluminum would infiltrate and soak the fibrous insulating board lining resulting in very little decrease in temperature through the infiltrated zone. Under such circumstances, the molten aluminum would pass entirely through the insulating lining and would reach and cause the failure of the outer steel shell of the refining vessel. Such infiltration of the molten metal to the steel shell obviously can not be tolerated.

Those skilled in the art will appreciate that the problem of such molten aluminum infiltration of the refractory fibrous insulating board lining of a refining system differs significantly from the treatment of a hard, dense material having a much higher density and an order of magnitude greater thermal conductivity. Such hard, dense material is commonly subject to surface deterioration as a result of shallow penetration by molten aluminum and resultant chemical reaction. The Drouzy et al patent, U.S. Pat. No. 4,174,972, discloses the addition of alkali or alkaline earth metal fluoride to prevent the gradual surface penetration of such hard, dense refractory material with molten metal, such as aluminum, that will result in swelling, cracking and the detaching of particles of refractory from the lining and their undesired presence in aluminum products. The hard, dense refractory material to which Drouzy et al refer is refractory material intended to withstand contact with molten aluminum in conventional practice, i.e. castable concrete having a high alumina-silica content, said hard, dense material not being infiltratable by molten aluminum. As indicated above, such conventional inner lining material possesses high density and high thermal conductivity characteristics as compared to the less dense, much lower thermal conductivity material normally used as an insulating lining but not as a molten aluminum barrier layer. It will be appreciated from the above that there is a genuine need in the art for the development of a holding and refining vessel incorporating refractory fibrous insulating board as a metal barrier, without such vessel being subject to undue aluminum infiltration of said refractory insulating board employed as a metal barrier in said vessel.

It is an object of the invention, therefore, to provide an improved all-refractory vessel for the holding and refining of aluminum.

It is another object of the invention to provide an all-refractory vessel for the holding and refining of aluminum in which a refractory fibrous insulating materials can be employed as a metal barrier therein without undue infiltration of said insulating board by aluminum under the operating conditions employed in said vessel.

With these and other objects in mind, the invention is hereinafter described in detail, the novel features thereof being particularly pointed out in the appended claims.

SUMMARY OF THE INVENTION

All-refractory aluminum holding and refining vessels have been constructed in which refractory fibrous insulating material has been as an aluminum barrier as well as an insulation layer. Undesired aluminum infiltration of the insulating material, which occurs surprisingly under the operating conditions of said vessels, is prevented by the presence of small amounts of metal halides employed in such fibrous insulating material employed as said aluminum barrier.

DETAILED DESCRIPTION OF THE INVENTION

The objects of the invention are accomplished by the use of refractory fibrous insulating materials in aluminum holding and refining vessels as an aluminum barrier layer, said insulating board having been produced so as to incorporate therein metal halides that serve to prevent the surprising aluminum infiltration of the internal voids otherwise found to occur with respect to such low density insulation material under the operating conditions typically employed in such vessels. While such low density, low thermal conductivity refractory fibrous insulating board is not normally subject to aluminum infiltration, as confirmed by laboratory tests in which samples of such material were immersed in molten aluminum for extended periods of time as indicated above, such aluminum infiltration is found to occur in aluminum holding and refining vessels not incorporating the invention as herein described and claimed.

It will be appreciated that, in particular embodiments, the apparatus of the invention, constituting a vessel for the holding of molten aluminum, with or without the refining of said aluminum, comprises an outer, typically steel, shell typically having said low density refractory insulating lining on the bottom and side walls thereof. Said insulation may be susceptible to the passage of molten aluminum therethrough. Positioned on the inner walls of said low density refractory lining is a treated refractory insulating material lining that serves as an additional insulation layer for the vessel. One inner side wall of the treated refractory insulating layer may be lined with a block lining of graphite or other dense, relatively high thermal conductivity refractory material. The electrical heating element is generally disposed within an opening in said block lining. The other inner side walls and the bottom are lined with a relatively thin layer of a suitable hard, dense refractory material that can be scraped clean without excessive damage thereto. It is very difficult to keep this dense inner refractory lining leak tight, so that said treated refractory insulating layer thus serves as an aluminum barrier of the vessel.

In the practice of the invention, the treated refractory insulation material, i.e. refractory fibrous insulating board or refractory fibrous insulating in castable form, used as an inner insulation layer and aluminum barrier has incorporated therein a small amount of metal fluorides or fluosilicates that serve to prevent significant aluminum infiltration of the internal voids of said board or castable insulation during use in refining operations. The mechanism enabling refractory fibrous insulating board or castable insulation not containing such metal halides to be resistant to aluminum infiltration in ordinary immersion testing is not fully understood. It is surmised, however, that the reason metal infiltration of such low density, fibrous insulation does not appear to occur in conventional testing and use is that there is sufficient earlier oxygen infiltration of the insulation, as from air, to prevent such metal infiltration thereof. When small pieces of said PC-45 insulating board material were completely submerged in molten aluminum and held down by a non-porous rod, no aluminum infiltration of the board was found to occur. It appears that the small amount of oxygen contained in the pores of said fibrous insulating board material was sufficient to form an oxide film barrier on the surface of the board such as to effectively preclude aluminum infiltration thereof.

In a test procedure that duplicated as closely as possible the conditions existing behind the graphite heater block of a refractory furnace or holding vessel, i.e., the location of the worse metal infiltration, a small piece of PC-45 board was housed in a vertical graphite tube that was open at the bottom and had a gas connection at the top. With nitrogen flowing into the tube, it was submerged in molten aluminum. The nitrogen flow was maintained high enough to keep liquid metal from entering the tube. The assembly was allowed to remain in this condition, for three hours at a metal temperature of 750-780° C., thereby simulating the typical holding time employed for refining system heat-up prior to metal fill. During this time, all of the oxygen contained in the pores of the fibrous insulation board had time to diffuse out of the board, and any volatiles, including water, had time to be vaporized and carried out of the board by said nitrogen. It should be noted that, in an actual refining system, the nitrogen employed for inerting the head space of the refining vessel is introduced into the heater block zone in order to inert this portion of the refining vessel and thus to reduce heater block oxidation.

In the test procedure, the nitrogen pressure was then reduced so that the liquid metal could rise up inside the graphite tube and push against the lower end of the sample insulation board being tested. Some gas continued to flow into the graphite tube and out through the pores of the graphite. The test system was maintained in this condition during test periods of from two to three days, after which the gas pressure was increased to push the metal back out of the tube, and the assembly was removed for inspection purposes.

It was found that it was possible to wet and infiltrate or penetrate the PC-45 insulation board with the molten aluminum employed in the test, i.e. aluminum containing about 0.2% Mg, with pure aluminum assumed to have the same effect. Such infiltration occurred even when the nitrogen gas being used for inerting inadvertently contained 20 ppm of oxygen and 100 ppm of water. Thus, an aluminum soak in of $\frac{3}{8}''$ occurred in a period of one day. Subsequent tests, with a more pure nitrogen atmosphere, resulted in infiltration rates of about ⅛" per day for three days. It was also found that, when argon was used as the inert gas in place of nitrogen, only spotty wetting of the surface, and only very slight infiltration of the internal voids of the insulation board, was found to occur in the course of a three day test period using aluminum plus 2% Mg, which will be understood to be a very aggressive alloy. Thus, the use of argon inerting or purge gas may be one possible solution to the problem of aluminum infiltration. This solution, as those skilled in the art will readily appreciate, would be a very expensive one from an operating cost standpoint. Thus, a more cost effective solution, such as that of the invention, was required for practical commercial aluminum refining operations.

The presence of a halide was viewed as another approach to stopping, or at least reducing aluminum wetting and infiltration of the refractory insulation, as by the introduction of chlorine with the nitrogen purge gas. Such use of chlorine would be hazardous, however, and would also tend to cause corrosion of the metal parts of the refining system. If the chlorides were to be put into the insulation board as water solutions, the fairly volatile nature of the chlorides at typical refining temperatures and their contact with aluminum would tend to result in the formation of very volatile aluminum chloride. This would likely cause their effectiveness to decrease rapidly with time of operation. In addition, many of such chloride compounds are hygroscopic in nature and would tend to promote corrosion of steel parts even at room temperature.

The metal halides incorporated into the refractory fibrous insulation board, or such insulation in castable form, in the improved refining vessel of the invention are preferably metallic fluorides, many of which have very high melting and boiling points. As indicated above, the incorporation of a small amount of fluorine into hard, dense non-fibrous castable refractory concrete having high deflection temperature and compressive strength properties was disclosed in the Drouzy et al patent. The presence of said fluorine, in the form of an alkali or alkaline earth metal fluoride, is said to prevent the material of the mass, containing $Al_2O_3$ and $SiO_2$, from being chemically or physicochemically attacked by the aluminum so as to adversely affect the refractory properties of the cement to an unacceptable extent. With reference to this patent, B. Gnyra of Alcon International Limited disclosed, in "Methods for Upgrading Common Silicate Refractories and Foundry Iron Implements Against the Attack by Molten Aluminum Alloys", Light Metals, 1986, that the refractories used in aluminum foundry practice, aluminum silicates, calcium silicates and the like are subject to considerable surface attack by molten aluminum, particularly by its more aggressive alloys. Gnyra discloses a treatment procedure involving the use of a fluoride salt solution combined in many instances with a refractory powder application, designated as a silicate-and-fluoride treatment. The fluoride solution is prepared from $MgSiF_6 \cdot 6H_2O$ crystals The refractory powder is employed as a slurry, which can be omitted when treating smooth refractory surfaces. It has also been determined that a mullite (alumina-silica) based, high density castable material, i.e. DRI-LIFE castable No. 423-E by Diddier-Taylor, said to be very resistant to surface attack by high magnesium-aluminum alloys, contains about 1¼ % fluorine in an insoluble form.

In the practice of the invention, the incorporation of small amounts of calcium fluoride into the lower density, fibrous refractory insulating board, or such insulation in castable form, is generally preferred. Such calcium fluoride is low in toxicity and is available in powdered form at modest cost. It will be understood, however, that other suitable metal fluorides or fluosilicates can also be employed. For example, aluminum fluoride, magnesium fluoride and other fluorides can be incorporated into the insulation.

The refractory fibrous insulation treated as herein described, with respect to which PC-45 insulating board is an illustrative example, generally comprises a ceramic fibrous refractory insulating material comprised of silica and alumina. The weight ratio of such material will be understood to vary depending upon the density of various commercial grades of such insulating board. Densities of below about 80 lb/ft$^3$, typically from about 15–20 lb./ft.$^3$ up to about 55–70 lb./ft.$^3$ or more, preferably from about 20 lb./ft.$^3$ up to about 60 lb./ft.$^3$, can be effectively employed in the practice of the invention. As indicated above, said fibrous insulating board has relatively low thermal conductivity levels of less than about 1.8, typically from about 1 to about 1.6 at 1500° F., as contrasted to the thermal conductivities of generally about 14 to 20 associated with hard, dense refractory materials having densities in the order of about 160 to about 180 lb/ft$^3$. The metal fluosilicate can be used with any compositions of fibrous refractory insulating material. When metal fluorides alone are used, however, the best results are obtained when the fibrous insulating board used in the practice of the invention incorporates a silica binder.

It is within the scope of the invention to incorporate about 0.5% up to about 5.0% by weight or more of said metal fluoride or fluosilicate, i.e., alkali or alkaline earth metal halide, into the low density refractory fibrous insulation employed in the improved vessel for the holding and refining of molten aluminum described and claimed herein. While the thickness of the treated refractory fibrous insulation employed in the practice of the invention may vary depending upon the operating conditions pertaining to any given aluminum application, it will be appreciated that the outside, i.e., the cool side, of the aluminum barrier lining of the vessel, i.e., the side toward the steel outer shell of the vessel, must be below the melting point of aluminum to assure against failure of the outer shell because of the infiltration of molten aluminum entirely through the vessel insulation. It is within the scope of the invention to either employ the treated fibrous insulating board for the entire insulation lining thickness required or to employ a sufficient amount of said treated fibrous insulating board, or such fibrous insulating material in castable form, to substantially prevent undesired aluminum infiltration, together with a further outer layer of untreated refractory insulating board so as to assure that the outer temperature of said treated insulation lining is thus below the melting point of aluminum. Those skilled in the art will appreciate that relatively higher density insulation is generally more heat conductive than lower density material, such as the relatively low density, untreated insulation typically employed as the outer insulating layer of the refining vessel. In a typical, illustrative refining vessel, about six or seven inches of insulation will commonly be employed, with, for example, about 4" of treated PC-45 fibrous insulating board being backed-up by 3" of untreated, generally low density insulating material. In embodiments in which a lower density, e.g., about 30 lb./ft.$^3$, fibrous insulating board, is employed in treated form, a typical vessel lining may comprise 3" of treated material and 4" of low density, untreated material. While it is generally desirable to employ only such treated fibrous insulating board as is necessary for a given vessel application, for reasons of expense and the like, it is noted again that the entire thickness of the vessel lining can comprise said treated fibrous insulating board or castable material without back-up on the cool, outer side of untreated insulating board adjacent to the shell.

Those skilled in the art will appreciate that various changes and modifications can be made in the details of the invention or in the preparation of the treated fibrous insulating board, or such insulating material in castable form, for use in the practice of the invention without departing from the scope of the invention as set forth in the appended claims. Thus it is known in the art that the commercially available fibrous refractory insulating board, or said insulating material in castable form, can be made by different manufacturing techniques using different refractory material-binder compositions. For the purposes of the invention, the metal halide additive can be added to the composition and thoroughly mixed therewith in any manner convenient and compatible with the process used to manufacture the refractory insulation. It will also be appreciated that, although the treated refractory insulating layer can comprise the inner surface of the holding or refining vessel, the inside of said vessel will commonly and preferably be lined with a hard, dense, relatively high thermal conductivity refractory material, which is easy to clean by scraping and the like. Alumina, silica carbide and graphite are illustrative examples of a suitable inner lining material providing ease of cleaning and maintenance. As indicated above, a block lining of graphite is typically employed for the inner side wall or walls of refining vessels in which it is desired to position electrical heating means in said side wall or walls. Because of the potential for oxidation of the graphite under the operating conditions typically prevailing in vessels used for the holding and refining of aluminum, such vessels commonly employ an inner graphite lining only in the side wall in which it is desired to position such electrical heating means.

Those skilled in the art will further appreciate that, in constructing a lining of fibrous insulating boards or such material in castable form, it is customary, but not essential, to fill any joints with a suitable refractory cement to reduce the open spaces between the insulating material as much as possible. The fibrous insulating boards or castable material are also generally, but not essentially, coated on all surfaces with a sealer. It has been found desirable, for example, to employ a commercial PC Extender, marketed by Rex-Roto Corporation, as a filler cement, with a small amount of metal halide, e.g., 2 ½ % by weight $CaF_2$, added thereto. For the sealer, the PC-Sealer marketed by Rex-Roto Corporation, desirably with metal halide additive, e.g. 5% by weight $CaF_2$, is convenient and effective.

In the use of the aluminum holding and refining vessels to which the invention is directed, the inerting of the head space of the vessel, using nitrogen, argon or other inerting gas, is typically carried out by introducing the inerting gas into the heater block zone in order to inert this region, and thus to reduce heater block oxidation. While this desirable procedure is believed to enable the oxygen Present in the pores of the insulation to diffuse out of said insulation, leading to the undesired aluminum infiltration of the insulation, it will be understood that other conditions prevailing in the refining vessel may also serve to cause the problem overcome by the use of the treated refractory fibrous insulating board or such material in castable form in the practice of the invention. While the problem of undesired aluminum infiltration of the internal voids of the relatively low density, fibrous insulating board or castable material has been found to occur most readily in the refractory fibrous material positioned immediately around the graphite heater block, it will be appreciated that said infiltration may also occur, although at a slower rate, in other parts of the vessel lining as well. The invention herein disclosed and claimed enables such aluminum infiltration to be effectively prevented in all portions of the vessel lining in which the treated refractory fibrous insulating material is employed.

In the laboratory test procedures described above, using treated fibrous refractory insulating board containing 2% $CaF_2$ in PC-45 board, no infiltration of the inner pores thereof by aluminum was found to occur in up to 3 days of testing at 750° C. In commercial aluminum refining vessels, it may be desirable to employ a higher $CaF_2$ or other metal halide concentration, particularly for high Mg alloys. Five aluminum refining systems constructed using the treated fibrous insulation containing 2% calcium fluoride have been in commercial operation for several months, and none of these systems have developed hot spots. In contrast, three systems previously constructed without use of said treated fibrous insulation developed hot spots due to aluminum infiltration in a few weeks of operation. One system incorporating said treated insulation was removed from service after two months of operation because of problems not associated with the insulation. When this system was partially disassembled for inspection, it was found that there had been no infiltration of the treated fibrous insulation board by molten aluminum.

The invention will be seen to represent a substantial advance in the art, overcoming a major problem experienced in practical commercial operations. By providing a means for preventing molten aluminum infiltration of the vessel insulating lining, the invention enables refining vessels to be employed in convenient size and without excessive heat loss for extended periods of service before maintenance, greatly enhancing the overall desirability and effectiveness of commercial aluminum refining operations.

I claim:

1. In a vessel adapted for the holding and refining of molten aluminum, and alloys thereof, in which an outer vessel shell has a refractory insulating lining on the bottom and side walls thereof, said lining being impervious to molten aluminum, the improvement comprising employing, for at least a portion of said lining, refractory fibrous insulating material having a very low density of below about 80 lb/ft$^3$, said material having a very low thermal conductivity of below 1.8 BTU/hr/ft$^2$ at a temperature gradient of 1° F. per inch at 1500° F., said refractory fibrous insulating material containing an alkaline or alkaline earth metal fluoride or fluosilicate therein in an amount within the range of from about 0.5 to about 5 % by weight based on the weight of said refractory fibrous insulating material, said fibrous insulating material not being infiltratable by the passage of molten aluminum into the inner voids thereof, whereby the presence of said metal fluoride or fluosilicate serves to effectively prevent the undesired infiltration of the refractory fibrous insulating material lining that serves as a molten aluminum barrier as well as an insulating lining.

2. The vessel of claim 1 in which said insulating material contains a metal fluoride.

3. The vessel of claim 1 in which said insulating material contains a fluosilicate.

4. The vessel of claim 2 in which said metal fluoride comprises calcium fluoride.

5. The vessel of claim 1 in which said refractory fibrous insulating material has a density of from about 15 to about 70 lb/ft$^3$.

6. The vessel of claim 5 in which said refractory fibrous insulating material has a density of from about 20 to about 60 lb/ft$^3$.

7. The vessel of claim 5 in which said metal fluoride or fluosilicate comprises calcium fluoride.

8. The vessel of claim 5 in which said metal fluoride or fluosilicate comprises calcium fluoride.

9. The vessel of claim 1 in which said refractory fibrous insulating material comprises fibrous insulating board.

10. The vessel of claim 1 in which said refractory fibrous insulating material comprises fibrous insulating material in castable form.

11. The vessel of claim 1 in which a hard, dense inner refractory lining is positioned on the inner surface of said refractory insulating lining, said inner lining comprising relatively high thermal conductivity material for relative ease of cleaning by the scraping of the surface thereof, said hard, dense lining having a density of from about 160 to about 180 lb/ft$^3$, the thermal conductivity thereof being on the order of from about 14 to about 20 BTU/ft$^2$ at a temperature gradient of 1° F. per inch at 1500° F.

12. The vessel of claim 11 in which said refractory fibrous insulating lining comprises at least the inner portion of the side wall around said graphite block.

13. The vessel of claim 12 in which said refractory fibrous insulating lining comprises the insulation of all of the walls of said vessel.

14. The vessel of claim 12 in which said refractory fibrous insulating material contains a metal fluoride.

15. The vessel of claim 13 in which said refractory fibrous insulating material contains a metal fluoride.

16. The vessel of claim 15 in which said metal fluoride is calcium fluoride.

17. The vessel of claim 5 in which said fibrous insulating material comprises fibrous insulating board.

18. The vessel of claim 14 in which said fibrous insulating material comprises fibrous insulating board.

* * * * *